US010031757B2

(12) United States Patent
Brownscheidle et al.

(10) Patent No.: US 10,031,757 B2
(45) Date of Patent: Jul. 24, 2018

(54) OPERATION OF A MULTI-SLICE PROCESSOR IMPLEMENTING A MECHANISM TO OVERCOME A SYSTEM HANG

(71) Applicant: International Business Machines Corporation, Armonk, NY (US)

(72) Inventors: Jeffrey C. Brownscheidle, Seattle, WA (US); Sundeep Chadha, Austin, TX (US); Maureen A. Delaney, Richmond, VT (US); Dhivya Jeganathan, Austin, TX (US); Dung Q. Nguyen, Austin, TX (US); Salim A. Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 15/042,902

(22) Filed: Feb. 12, 2016

(65) Prior Publication Data
US 2017/0235577 A1 Aug. 17, 2017

(51) Int. Cl.
*G06F 9/38* (2018.01)
(52) U.S. Cl.
CPC .................. *G06F 9/3836* (2013.01)
(58) Field of Classification Search
None
See application file for complete search history.

(56) References Cited

U.S. PATENT DOCUMENTS

| 7,003,648 B2 | 2/2006 | Chrysos et al. |
| 7,711,929 B2 | 5/2010 | Burky et al. |
| 2007/0005865 A1* | 1/2007 | Spry .................. G06F 12/0831 710/306 |
| 2007/0074005 A1* | 3/2007 | Abernathy ............ G06F 9/3814 712/214 |

(Continued)

OTHER PUBLICATIONS

Anonymous, "Age Tracking of Instructions in a Non-Shifting Issue Queue", An IP.com Prior Art Database Technical Disclosure (online), IP.com No. 000243948, URL: http://ip.com/IPCOM/000243948, dated Oct. 29, 2015, 4 pages.

(Continued)

*Primary Examiner* — John Lindlof
(74) *Attorney, Agent, or Firm* — Joseph D. Downing; Robert R. Williams; Kennedy Lenart Spraggins LLP

(57) ABSTRACT

Operation of a multi-slice processor that includes execution slices and a dispatch network of the multi-slice processor implementing a hardware level mechanism to overcome a system hang. Such a multi-slice processor includes a plurality of execution slices and a dispatch network of the multi-slice processor implementing a hardware level mechanism to overcome a system hang. Operation of such a multi-slice processor includes, storing, in one or more logical units of a plurality of logical units of an age array, a logical value representing a relative age between instructions; propagating, in response to a current instruction being in a hang state, a hang signal to the plurality of logical units of the age array; in response to the hang signal, generating, (Continued)

from the plurality of logical units, a plurality of logical output values indicating a next instruction ready for execution; and issuing the next instruction for execution.

20 Claims, 6 Drawing Sheets

(56) References Cited

U.S. PATENT DOCUMENTS

2008/0320478 A1* 12/2008 Singh .................... G06F 9/3814
   718/102

OTHER PUBLICATIONS

Anonymous, "Detecting Next-to-Finish Rejects and Altering Issue Q Selection to Precisely Select an Instruction", An IP.com Prior Art Database Technical Disclosure (online), IP.com No. 000216901, URL: http://ip.com/IPCOM/000216901, dated Apr. 23, 2012, 2 pages.

* cited by examiner

OPERATION OF A MULTI-SLICE PROCESSOR IMPLEMENTING A MECHANISM TO OVERCOME A SYSTEM HANG

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a dispatch network of the multi-slice processor implementing a hardware level mechanism to overcome a system hang. Operation of such a multi-slice processor includes, storing, in one or more logical units of a plurality of logical units of an age array, a logical value representing a relative age between instructions; propagating, in response to a current instruction being in a hang state, a hang signal to the plurality of logical units of the age array; in response to the hang signal, generating, from the plurality of logical units, a plurality of logical output values indicating a next instruction ready for execution; and issuing the next instruction for execution.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
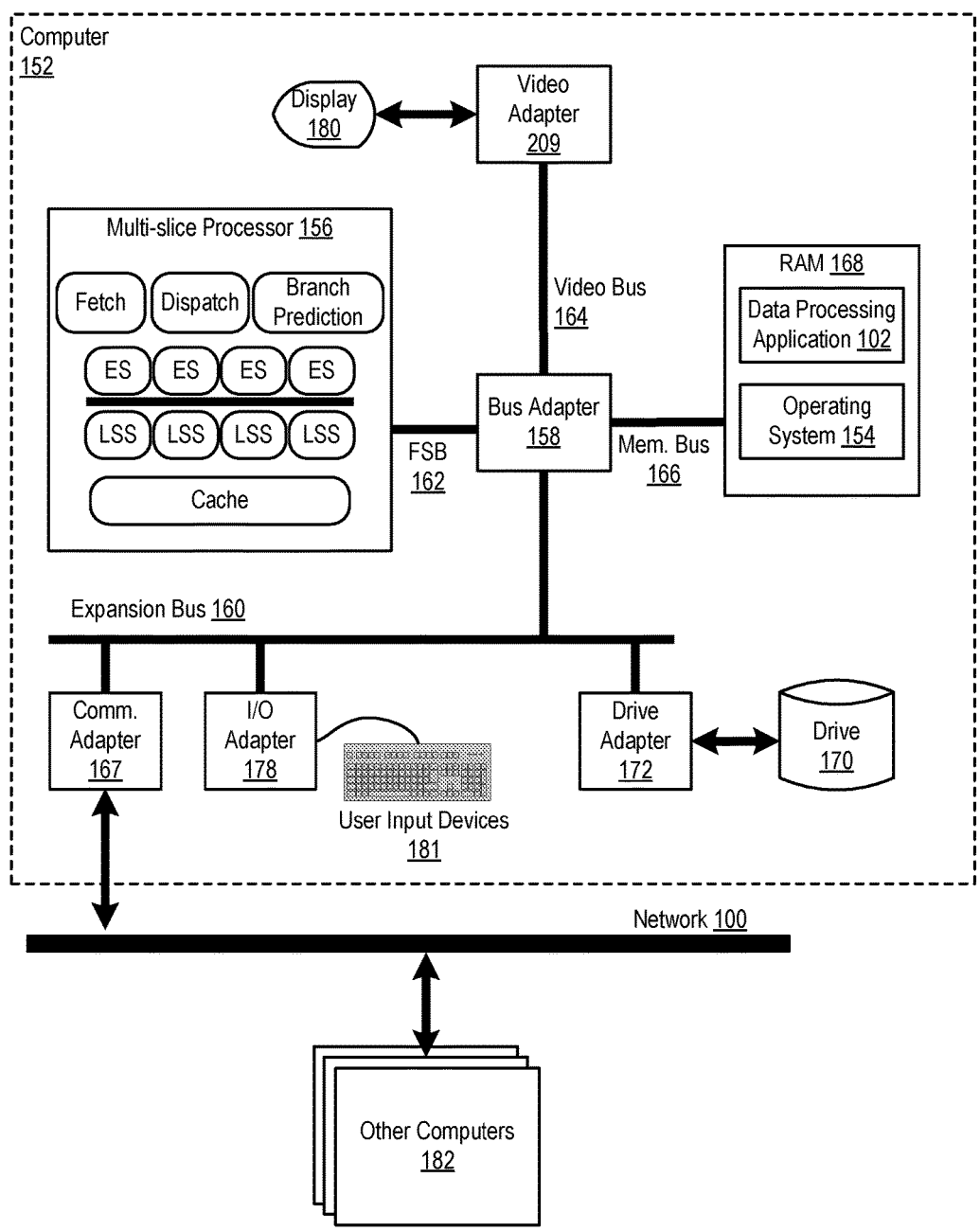
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
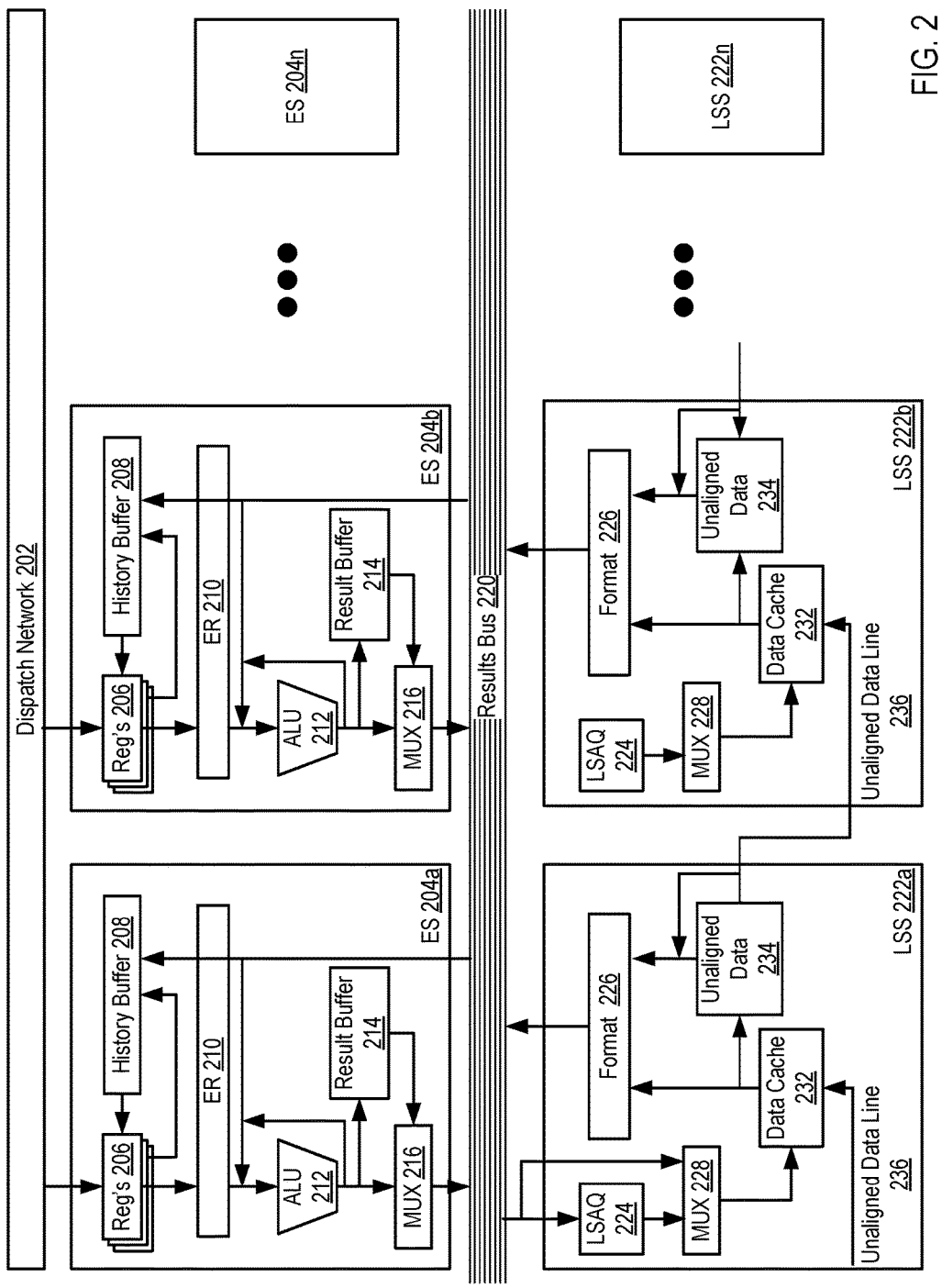
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit (212) or to a load/store slice (222a, 222b, 222c) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then be issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

Figure 3:
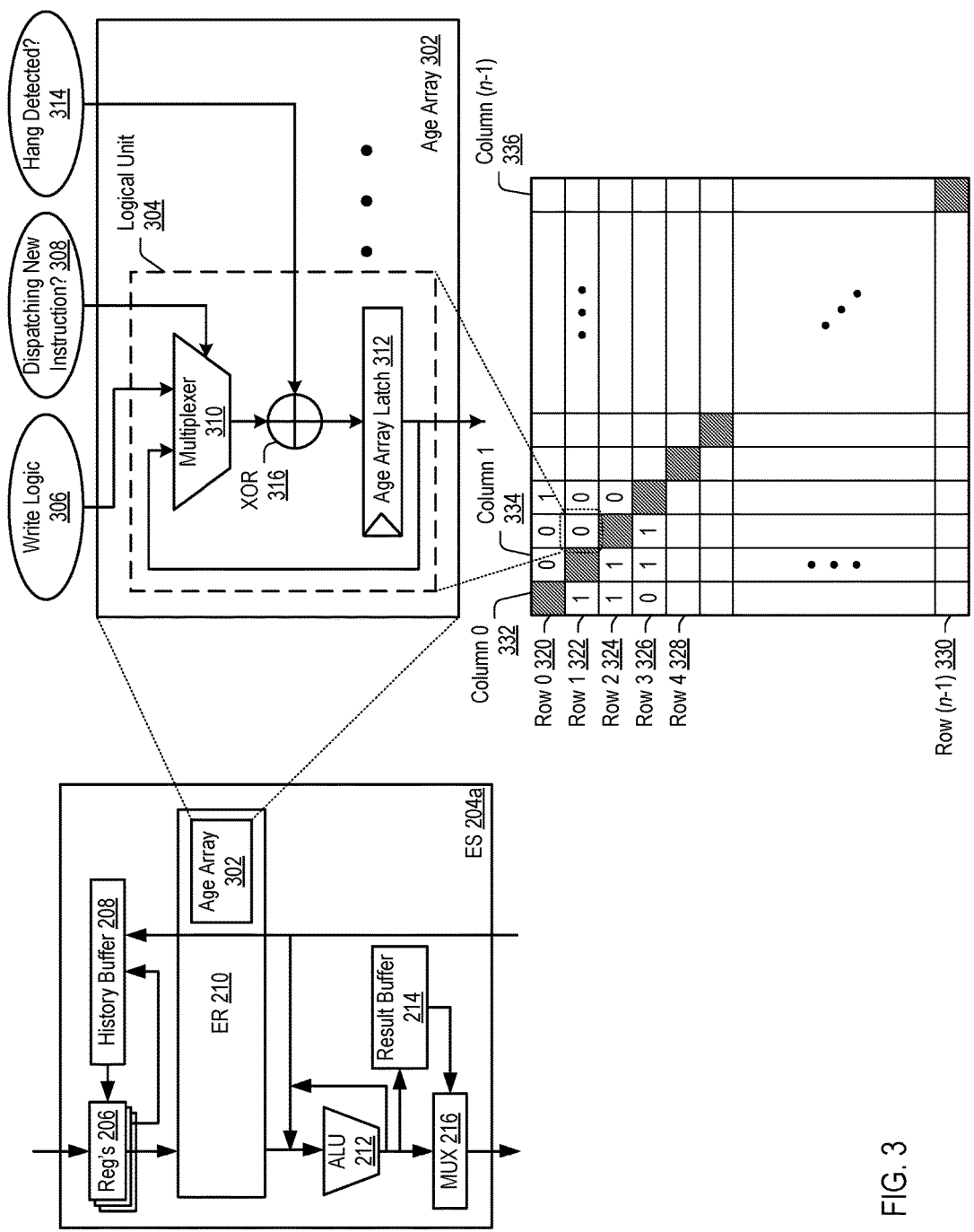
FIG. 3 sets forth a block diagram of a portion of the execution reservation station of an execution slice of a multi-slice processor implementing a mechanism to overcome a system hang according to embodiments of the present invention.

For further explanation, FIG. 3 sets forth a block diagram of a portion of the execution reservation station (210) of an execution slice (204a) of a multi-slice processor (156) implementing a mechanism to overcome a system hang. The execution slice (204a) may include an issue queue, a ready vector, and an age array for determining a next instruction to execute.

An issue queue may specify multiple instructions from the dispatch network (202) to be issued, where each of the instructions specified by the issue queue correspond, respectively, to a ready value in the ready vector. Depending on the ready value for an entry of the ready vector, a corresponding instruction in the issue queue may be determined to be ready for execution or not. For example, if an issue queue specifies 12 instructions, then a ready value in a ready vector at position 5 would indicate whether an instruction at position 5 of the issue queue is ready for execution. Further, the ready vector may be referenced before the age array so that only ready instructions may be considered, regardless of the age of the instructions as indicated by the age array.

At a given time, multiple different instructions in the issue queue may be ready for execution, and to select which of these ready instructions is to be executed next, the age array is used to select an oldest instruction among the ready instructions to execute. As depicted in FIG. 3, the age array (302) includes a plurality of logical units (304), where each logical unit corresponds to a stored value in a representation of an array of rows and columns corresponding to instructions in the issue queue.

For an issue queue of length n, the age array (302) may include a quantity of logical units (304) such that for each row representing an entry in the issue queue, there are (n−1) logical units representing (n−1) different columns, where each column corresponds to an entry in the issue queue. In this example, if {row i, column j} has a value of 0, then issue queue entry i is older than issue queue entry j, otherwise, issue queue entry i is younger than issue queue entry j. In this way, each logical unit stores a value representative of a row i and column j, where the value indicates a relative age of instructions at positions i and j within the issue queue.

Continuing with this example, and as depicted in FIG. 3, a logical unit corresponding to age array position {row 0 (320), column 1 (334)} stores logical value zero—indicating that the instruction at issue queue position zero is older than the instruction at issue queue position 1. Similarly, a logical unit corresponding to age array position {row 2 (324), column 0 (332)} stores logical value one—indicating that the instruction at issue queue position two is younger than the instruction at issue queue position 0. Similarly, row 1 (322), row 3 (326), row 4 (328) . . . row (n–1) (330), and column 0 (332), column 1 (334) . . . column (n–1) (336) provide information serving as a basis for determining relative ages of all instructions in the issue queue.

As depicted in FIG. 3, write logic (306) provides values to be written into the logical unit (304), and signal (308) selects the input to multiplexer (310), where signal (308) depends upon whether a new instruction is being dispatched—which may result in a new value being stored in the logical unit (304). For example, if a new instruction is being dispatched, then signal (308) may select as input the output from write logic (306), where the output of the multiplexer (310) is written to age array latch (312). Under normal operation, there would be no system hang detected, and consequently, signal (314) would be logic low, which results in the output from multiplexer (310) passing through XOR gate (316) unchanged, and being written to age array latch (312) without any change.

If signal (308) indicates that no new instruction is dispatched, then the value stored in the logical unit (304) remains unchanged, and the input to the multiplexer is the currently stored value in the age array latch (312).

In this way, under normal operation, the age array (302) maintains information for determining a relative age of each instruction in the issue queue relative to every other instruction in the issue queue. Consequently, the age array (302) maintains information for determining an oldest instruction in the issue queue, which in combination with the ready vector, serves as a basis for issuing the oldest, ready instruction. Further, as instructions are executed and as instructions enter the issue queue, the age array (302) is updated to reflect current relative ages of the instructions in the issue queue.

As depicted in FIG. 3, the XOR gate (316), has one input from the multiplexer (310) and one input from signal (314)—where a signal (314) indicates a system hang. If there is a system hang, then signal (314) is logic high, which toggles the output of multiplexer (310), which, since a new instruction is not being dispatched during a hang, would output the inverse of the value currently stored in the age array latch (312). In this way, in response to a system hang being detected, and signal (314) being driven to logic high, all values stored within the age array are inverted (302). As such, the same age array logic which enables determination of the oldest ready instruction, may instead automatically identify the youngest ready instruction—thereby allowing the system to continue execution with an alternate instruction when a system hang is detected.

In a different implementation, determining an instruction to issue in response to detecting a system hang may be done without using an age array. For example, an instruction may be randomly selected from the issue queue, and if the instruction is ready, then the instruction may be issued. In this way, while the instruction causing the system hang remains stuck, other instructions may continue to execute—thereby allowing the system to continue execution with another instruction when a system hang is detected. In other words, in response to detecting a system hang, the determination and selection of an alternate ready instruction may serve as a basis for enabling a system to execute alternate instructions during a hang state of a given instruction.

Figure 4:
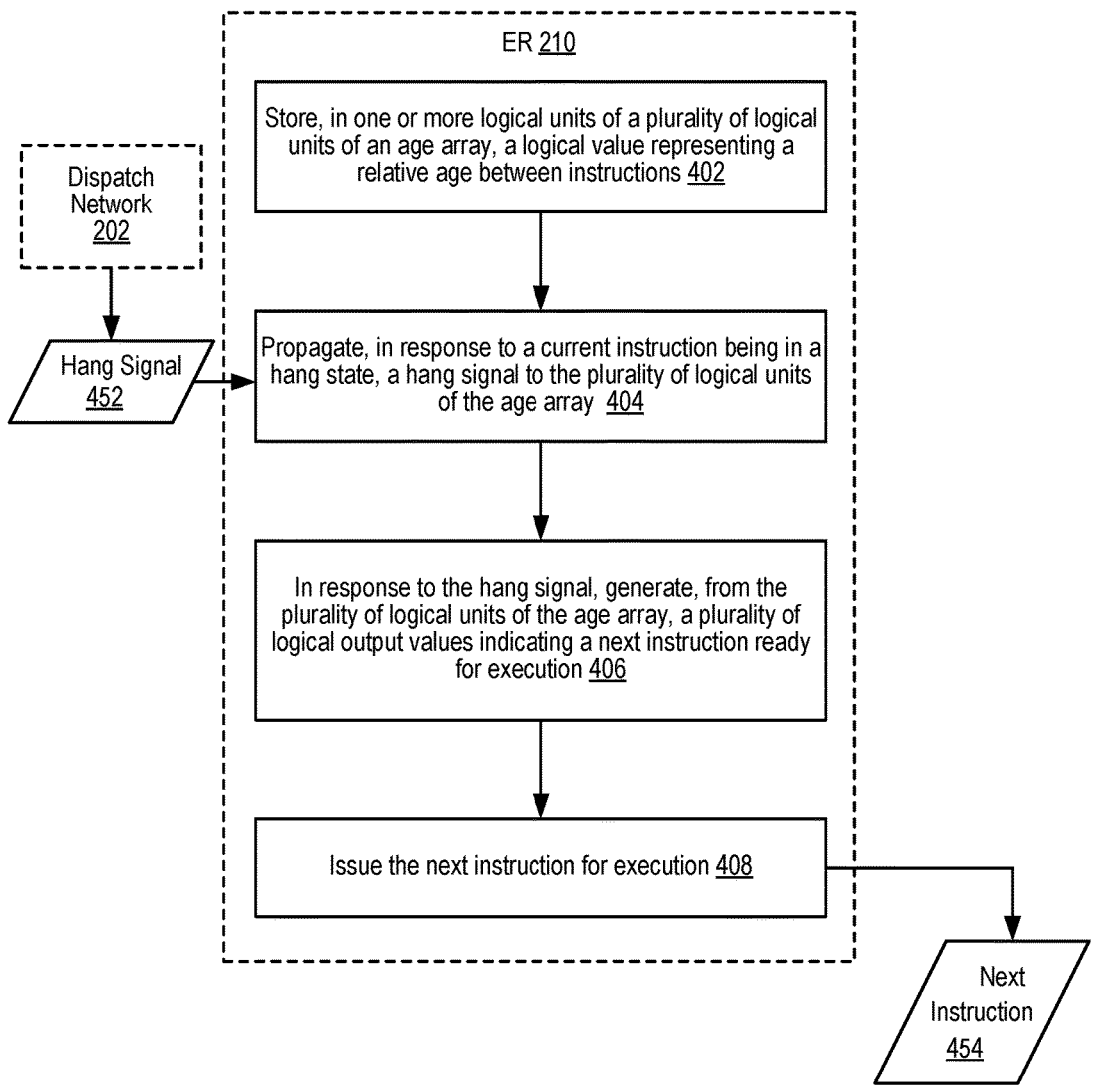
FIG. 4 forth a flow chart illustrating an exemplary method of operation of a multi-slice processor implementing a hardware level mechanism to overcome a system hang according to embodiments of the present invention.

For further explanation, FIG. 4 sets forth a flow chart illustrating an exemplary method of operation of an execution slice (204a) of a multi-slice processor (156) implementing a mechanism to overcome a system hang. The method of FIG. 4 may be carried out by the multi-slice processor (156) similar to that in the examples of FIGS. 2 and 3.

The method of FIG. 4 includes, storing (402), in one or more logical units of a plurality of logical units (304) of an age array (302), a logical value representing a relative age between instructions. Storing (402) a logical value representing a relative age between instructions may be carried out by write logic (306) providing a write value to multiplexer (310), and the multiplexer output going through XOR gate (316) to be stored in age array latch (312). As described above with regard to FIG. 3, if signal (308), indicating a new instruction being dispatched, then the multiplexer (310) input selected is the write logic (306) output, and otherwise, the multiplexer (310) output is the previously stored value in age array latch (312).

Further, output from the multiplexer (310) is XOR'd with signal (314)—where signal (314) indicates a system hang, where if there is no system hang, the value stored in the age array latch (312) is the non inverted value output from the multiplexer (310), and where if there is a system hang, the value stored in the age array latch (312) is the inverse of the output from the multiplexer (310). As described above with regard to FIG. 3, the ready vector and the age array may be used to determine a next ready instruction.

In this way, a different instruction than the oldest ready instruction in the issue queue may be issued in dependence upon whether a system hang has been detected and a corresponding signal has been propagated to the logical units (304) of the age array (302).

The method of FIG. 4 also includes propagating (404), in response to a current instruction being in a hang state, a hang signal (452) to the plurality of logical units (304) of the age array (302). Propagating (404) a hang signal to the plurality of logical units of the age array may be carried out by the signal (314), indicating a system hang, being driven to a logic high value in response to a hardware unit or software unit detecting a system hang due to, for example, the oldest ready instruction not progressing toward completion. As described above with regard to FIG. 3, signal (314) may be propagated to each of the plurality of logical units (304) of the age array (302).

On response to the hang signal (452), the method of FIG. 4 continues by generating (406), from the plurality of logical units (304), a plurality of logical output values indicating a next instruction ready for execution. Generating (406) a plurality of logical output values indicating a next ready instruction for execution may be carried out by the signal (314) toggling all of the output values of the age array (302). In this way, in dependence upon the ready vector indicating readiness of a given instruction, a next ready instruction may be identified based on analyzing the outputs of the age array, thereby providing an indication of a next ready instruction. Further, in response to detecting that the system is no longer in a hang state, the signal (314) may be driven to logic low, and the age array (302) may again identify an oldest instruction.

The method of FIG. 4 also includes issuing (408) the next instruction (454) for execution. Issuing (408) the next instruction for execution may be carried out by the execution reservation station (210) issuing the youngest, ready instruction for execution. The issuance of the youngest, ready instruction may be performed while the instruction causing the hang state remains in a hang state—thereby overcoming some of the delay caused by a system hang.

Figure 5:
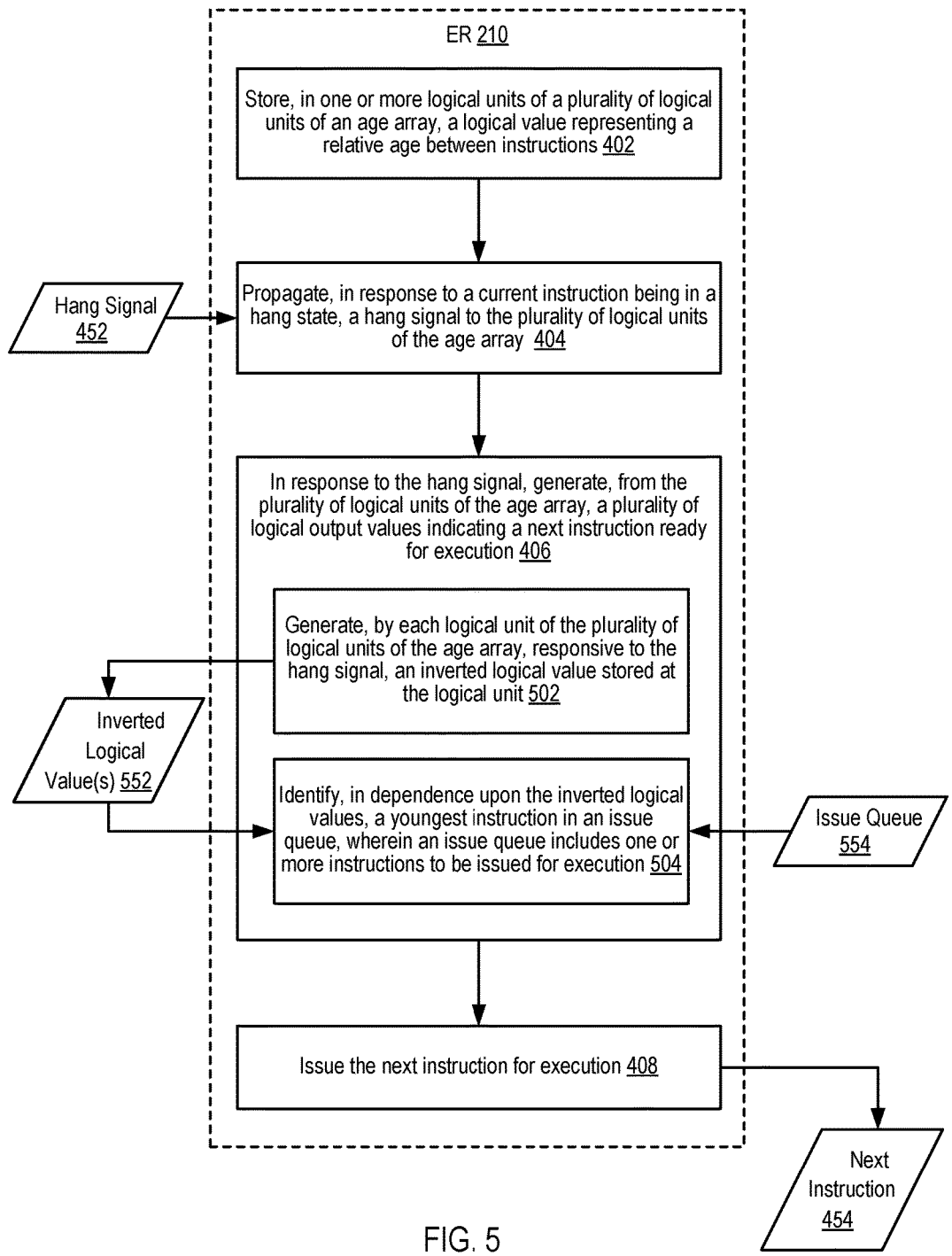
FIG. 5 forth a flow chart illustrating an exemplary method of operation of a multi-slice processor implementing a hardware level mechanism to overcome a system hang according to embodiments of the present invention.

For further explanation, FIG. 5 sets forth a flow chart illustrating another exemplary method of operation of an execution slice (204a) of a multi-slice processor (156) implementing a mechanism to overcome a system hang. The method of FIG. 5 may be carried out by the multi-slice processor (156) similar to that in the examples of FIGS. 2-4.

The method of FIG. 5 is similar to the method of FIG. 4 in that the method of FIG. 5 also includes storing (402), in one or more logical units of a plurality of logical units (304) of an age array (302), a logical value representing a relative age between instructions; propagating (404), in response to a current instruction being in a hang state, a hang signal (452) to the plurality of logical units (304) of the age array (302); in response to the hang signal (452), generating (406), from the plurality of logical units (304), a plurality of logical output values indicating a next instruction ready for execution; and issuing (408) the next instruction (454) for execution.

The method of FIG. 5 differs, however, from the method of FIG. 4 in that the method of FIG. 5 includes generating (502), by each logical unit (304) of the plurality of logical units of the age array (302), responsive to the hang signal (452), an inverted logical value (552) of a logical value stored at the logical unit. Generating (502) an inverted logical value (552) of a logical value stored at the logical unit may be carried out by the hang signal (452) being driven to a logical high value in response to detecting a system hang state, as described above with regard to FIG. 3. For example, hardware logic or system software may determine that a currently executing instruction is not progressing, and in response, a hang state may be determined and the hang signal (314), depicted in FIG. 3, may be driven to a logical high state, and the signal (314) may be propagated to each of the logical units (304) of the age array (302).

Further, the signal (314) is an input to XOR gate (316), and given that the signal (314) is a logic high value, then the output of the XOR gate (316) is the inverse of the output of multiplexer (310). In this way, instead of the age array (302) indicating an oldest instruction, which would be the case without the signal (314) providing a logic high value to the XOR gate (316), the age array (302) indicates a youngest instruction.

The method of FIG. 5 also includes identifying (504), in dependence upon the inverted logical values (552), a youngest instruction in the issue queue (554). Identifying (504) the youngest instruction may be carried out by comparing the logic value of each of the logic units (304) of the age array (302). For example, as each row, which corresponds to an instruction in the issue queue, is considered, each column value, stored in a logic unit, may be accessed to determine an age of the instruction relative to every other instruction in the issue queue. As each row is processed, and as each column for each row is processed, the ages of each instruction in the issue queue relative to other instructions in the issue queue may be determined. Consequently, the youngest instruction in the issue queue may be determined. While in this example the youngest ready instruction is selected, in other examples, a next youngest, or more generally, any other ready instruction aside from the currently hung instruction, may be selected for issuance.

Figure 6:
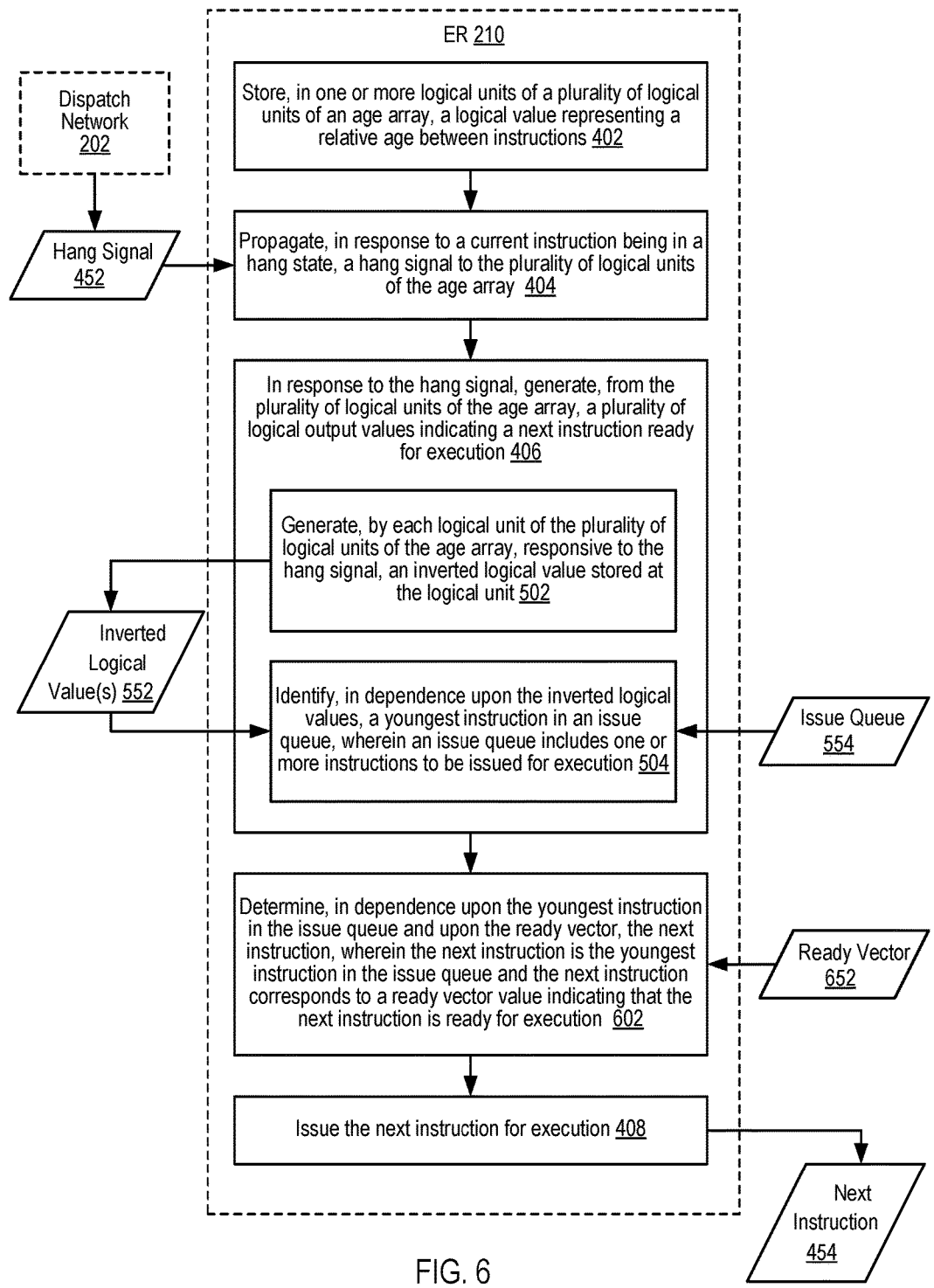
FIG. 6 sets forth a flow chart illustrating an exemplary method of operation of a multi-slice processor implementing a hardware level mechanism to overcome a system hang according to embodiments of the present invention.

For further explanation, FIG. 6 sets forth a flow chart illustrating another exemplary method of operation of an execution slice (204a) of a multi-slice processor (156) implementing a mechanism to overcome a system hang. The method of FIG. 6 may be carried out by the multi-slice processor (156) similar to that in the examples of FIGS. 2-5.

The method of FIG. 6 is similar to the method of FIG. 4 in that the method of FIG. 6 also includes storing (402), in one or more logical units of a plurality of logical units (304) of an age array (302), a logical value representing a relative age between instructions; propagating (404), in response to a current instruction being in a hang state, a hang signal (452) to the plurality of logical units (304) of the age array (302); in response to the hang signal (452), generating (406), from the plurality of logical units (304), a plurality of logical output values indicating a next instruction ready for execution; and issuing (408) the next instruction (454) for execution.

The method of FIG. 6 differs, however, from the method of FIG. 4 in that the method of FIG. 6 includes determining (602), in dependence upon the youngest instruction in the issue queue (554) and upon a ready vector (652), the next instruction, where the next instruction is the youngest instruction in the issue queue that also has a corresponding ready vector value indicating that the instruction is ready for execution. Determining (602) the next instruction may be carried out by using the ready vector to only reference values generated from the age array that are ready for execution so that any instruction identified using the age array is ready for execution. For example, the ready vector may store a single bit for each of the n entries of the issue queue, where the bit value may be logic high to indicate that an instruction is ready for execution, and where a bit value may be logic low to indicate that the instruction is not ready for execution. Given the youngest, ready instruction, an instruction may be issued during a hang state of another instruction, thereby overcoming some of the delay caused by a system hang.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices, wherein each execution slice comprises an age array comprising a plurality of logic units, wherein each logic unit stores a value representing a relative age between instructions, the method comprising:
    propagating, in response to a current instruction being in a hang state, a hang signal to the plurality of logic units of the age array;
    responsive to the hang signal, generating, from the plurality of logic units of the age array, a plurality of output values indicating a next instruction ready for execution, wherein generating the plurality of output values indicating the next instruction ready for execution comprises identifying, as the next instruction ready for execution, a youngest instruction ready for execution by inverting each value in the age array; and
    issuing the next instruction for execution.

2. The method of claim 1, wherein each execution slice comprises an issue queue including one or more instructions to be issued for execution, and wherein the age array, responsive to no hang signal, generates a plurality of output values indicating an oldest instruction in an issue queue.

3. The method of claim 2, wherein each execution slice further comprises a ready vector indicating whether an instruction in the issue queue corresponding to a ready vector value is ready for execution.

4. The method of claim 2, wherein each row of the age array corresponds to an entry in the issue queue, and wherein a first value at a particular row and a particular column indicates that the instruction in the issue queue corresponding to the particular row is younger than the instruction in the issue queue at the particular column.

5. The method of claim 4, wherein a second value at a particular row and a particular column indicates that the instruction in the issue queue corresponding to the particular row is older than the instruction in the issue queue at the particular column.

6. The method of claim 4, wherein identifying, as the next instruction ready for execution, the youngest instruction ready for execution by inverting each value in the age array comprises:
   generating, by each logical unit of the plurality of logical units of the age array, responsive to the hang signal, an inverted logical value stored at the logical unit; and
   identifying, in dependence upon the inverted logical values, the youngest instruction in the issue queue.

7. The method of claim 3, further comprising:
   determining, in dependence upon the youngest instruction in the issue queue and upon the ready vector, the next instruction, wherein the next instruction is the youngest instruction in the issue queue and the next instruction corresponds to a ready vector value indicating that the next instruction is ready for execution.

8. A multi-slice processor comprising:
   a plurality of execution slices, wherein each execution slice comprises an age array comprising a plurality of logic units, wherein each logic unit stores a value representing a relative age between instructions, and wherein the multi-slice processor is configured to carry out the steps of:
   propagating, in response to a current instruction being in a hang state, a hang signal to the plurality of logic units of the age array;
   responsive to the hang signal, generating, from the plurality of logic units of the age array, a plurality of output values indicating a next instruction ready for execution, wherein generating the plurality of output values indicating the next instruction ready for execution comprises identifying, as the next instruction ready for execution, a youngest instruction ready for execution by inverting each value in the age array; and
   issuing the next instruction for execution.

9. The multi-slice processor of claim 8, wherein each execution slice comprises an issue queue including one or more instructions to be issued for execution, and wherein the age array, responsive to no hang signal, generates a plurality of output values indicating an oldest instruction in an issue queue.

10. The multi-slice processor of claim 9, wherein each execution slice further comprises a ready vector indicating whether an instruction in the issue queue corresponding to a ready vector value is ready for execution.

11. The multi-slice processor of claim 9, wherein each row of the age array corresponds to an entry in the issue queue, and wherein a first value at a particular row and a particular column indicates that the instruction in the issue queue corresponding to the particular row is younger than the instruction in the issue queue at the particular column.

12. The multi-slice processor of claim 11, wherein a second value at a particular row and a particular column indicates that the instruction in the issue queue corresponding to the particular row is older than the instruction in the issue queue at the particular column.

13. The multi-slice processor of claim 11, wherein identifying, as the next instruction ready for execution, the youngest instruction ready for execution by inverting each value in the age array comprises:
   generating, by each logical unit of the plurality of logical units of the age array, responsive to the hang signal, an inverted logical value stored at the logical unit; and
   identifying, in dependence upon the inverted logical values, the youngest instruction in the issue queue.

14. The multi-slice processor of claim 10, further comprising:
   determining, in dependence upon the youngest instruction in the issue queue and upon the ready vector, the next instruction, wherein the next instruction is the youngest instruction in the issue queue and the next instruction corresponds to a ready vector value indicating that the next instruction is ready for execution.

15. An apparatus comprising:
   a multi-slice processor that includes a plurality of execution slices, wherein each execution slice comprises an age array comprising a plurality of logic units, and wherein each logic unit stores a value representing a relative age between instructions; and
   a computer memory operatively coupled to the multi-slice processor, wherein the multi-slice processor is configured to carry out the steps of:
   propagating, in response to a current instruction being in a hang state, a hang signal to the plurality of logic units of the age array;
   responsive to the hang signal, generating, from the plurality of logic units of the age array, a plurality of output values indicating a next instruction ready for execution, wherein generating the plurality of output values indicating the next instruction ready for execution comprises identifying, as the next instruction ready for execution, a youngest instruction ready for execution by inverting each value in the age array; and
   issuing the next instruction for execution.

16. The apparatus of claim 15, wherein each execution slice comprises an issue queue including one or more instructions to be issued for execution, and wherein the age array, responsive to no hang signal, generates a plurality of output values indicating an oldest instruction in an issue queue.

17. The apparatus of claim 16, wherein each execution slice further comprises a ready vector indicating whether an instruction in the issue queue corresponding to a ready vector value is ready for execution.

18. The apparatus of claim 16, wherein each row of the age array corresponds to an entry in the issue queue, and wherein a first value at a particular row and a particular column indicates that the instruction in the issue queue corresponding to the particular row is younger than the instruction in the issue queue at the particular column.

19. The apparatus of claim 18, wherein a second value at a particular row and a particular column indicates that the instruction in the issue queue corresponding to the particular row is older than the instruction in the issue queue at the particular column.

20. The apparatus of claim 18, wherein identifying, as the next instruction ready for execution, the youngest instruction ready for execution by inverting each value in the age array comprises:
   generating, by each logical unit of the plurality of logical units of the age array, responsive to the hang signal, an inverted logical value stored at the logical unit; and
   identifying, in dependence upon the inverted logical values, the youngest instruction in the issue queue.

* * * * *